US012695407B2

(12) United States Patent
Bachman et al.

(10) Patent No.: US 12,695,407 B2
(45) Date of Patent: Jul. 28, 2026

(54) MULTI-BLADE MOTOR CONTROL BY SINGLE POWER STAGE

(71) Applicant: CURTIS INSTRUMENTS, INC., Mount Kisco, NY (US)

(72) Inventors: Michael S. Bachman, Kohler, WI (US); Roger White, Kohler, WI (US)

(73) Assignee: Parker-Hannifin Corporation, Cleveland, OH (US)

( * ) Notice: Subject to any disclaimer, the term of this patent is extended or adjusted under 35 U.S.C. 154(b) by 152 days.

(21) Appl. No.: 18/583,227

(22) Filed: Feb. 21, 2024

(65) Prior Publication Data

US 2024/0313690 A1    Sep. 19, 2024

Related U.S. Application Data

(60) Provisional application No. 63/452,538, filed on Mar. 16, 2023.

(51) Int. Cl.
| | |
|---|---|
| *H02P 29/028* | (2016.01) |
| *A01D 34/00* | (2006.01) |
| *H02P 29/10* | (2016.01) |
| *A01D 101/00* | (2006.01) |

(52) U.S. Cl.
CPC .......... *H02P 29/028* (2013.01); *A01D 34/006* (2013.01); *H02P 29/10* (2016.02); *A01D 2101/00* (2013.01)

(58) Field of Classification Search
CPC . A01D 34/006; A01D 2101/00; H02P 29/028; H02P 29/10
See application file for complete search history.

(56) References Cited

U.S. PATENT DOCUMENTS

| | | | | |
|---|---|---|---|---|
| 9,783,203 B2 * | 10/2017 | Koike | ..................... | H02P 23/14 |
| 10,292,326 B2 * | 5/2019 | Tanabe | ................. | A01D 43/063 |
| 10,687,464 B2 * | 6/2020 | Zeiler | .................. | A01D 34/006 |
| 12,145,674 B2 * | 11/2024 | Zeiler | ..................... | B60K 1/04 |
| 2015/0289444 A1 * | 10/2015 | Koike | .............. | B60W 30/1886 |
| | | | | 701/50 |
| 2017/0222579 A1 * | 8/2017 | Wang | ........................ | B25F 5/00 |
| 2018/0192580 A1 * | 7/2018 | Zeiler | ................... | A01D 69/02 |

OTHER PUBLICATIONS

Extended European Search Report, European Application 24 16 1921.2, Dec. 5, 2024, 13 pp.

* cited by examiner

*Primary Examiner* — Thai T Dinh
(74) *Attorney, Agent, or Firm* — The Belles Group, P.C.

(57) ABSTRACT

An apparatus for motor control of a lawnmower includes multiple blade motors, a logic circuit and a power circuit. The plurality of blade motors are coupled to the lawnmower and configured for cutting vegetation. The logic circuit configured to receive a feedback signal from each of the plurality of blade motors and generate an output signal. The power circuit is configured to drive each of the plurality of blade motors simultaneously in response to the output signal such that the speed of all of the plurality of blade motors is lowered when the feedback signal indicates that one of the plurality of blade motors has encountered an obstruction, clog, or another type of high load.

17 Claims, 9 Drawing Sheets

10

222

200

S101

Receive feedback data for an obstructed motor of a plurality of blade motors.

S103

Performs a comparison of the feedback data to a threshold.

S105

Generates a reset signal for a plurality of blade motors in response to the comparison.

MULTI-BLADE MOTOR CONTROL BY SINGLE POWER STAGE

CROSS REFERENCE TO RELATED APPLICATIONS

The present application claims the benefit of U.S. Provisional Patent Application No. 63/452,538, filed Mar. 16, 2023, which is incorporated herein by reference in its entirety.

FIELD

The present application relates to motor control for multiple motors in a lawnmower.

BACKGROUND

There are many every day appliances or devices that utilize an electric motor. Examples include electric shavers, vacuum cleaners, fans, hair dryers, car windows, and power tools. A large variety of motors are available, including alternating current (AC) motors, direct current (DC) motors, induction motors, brushed motors, wound motors, permanent magnet motors, and others to control the traction drive and other accessories of electric vehicles such as cars, golf carts, and others.

Motor speed control is invariably part of these every day appliances or devices. Constant speed control may be used in AC motors and defined according to the number of poles in the motor as well as the AC line frequency. Example speed control includes a Variable Frequency Drive (VFD), Adjustable Speed Drive (ASD), and Frequency Converter (FC). A motor may be speed controlled according to the applied voltage using a feedback system.

One specific example is a brushless motor that is electrically commutated in which a controller switches currents through motor windings to produce rotating magnetic fields to lead the rotor to rotate. Brushless motors may be used for turning the cutting blades of an electric lawnmower. As opposed to other applications such as the traction drive of vehicles and other examples above, precise speed control is unnecessary for driving the blades of the lawnmower.

BRIEF DESCRIPTION OF THE DRAWINGS

Exemplary embodiments are described herein with reference to the following drawings, according to an exemplary embodiment.

DETAILED DESCRIPTION

Figure 1:
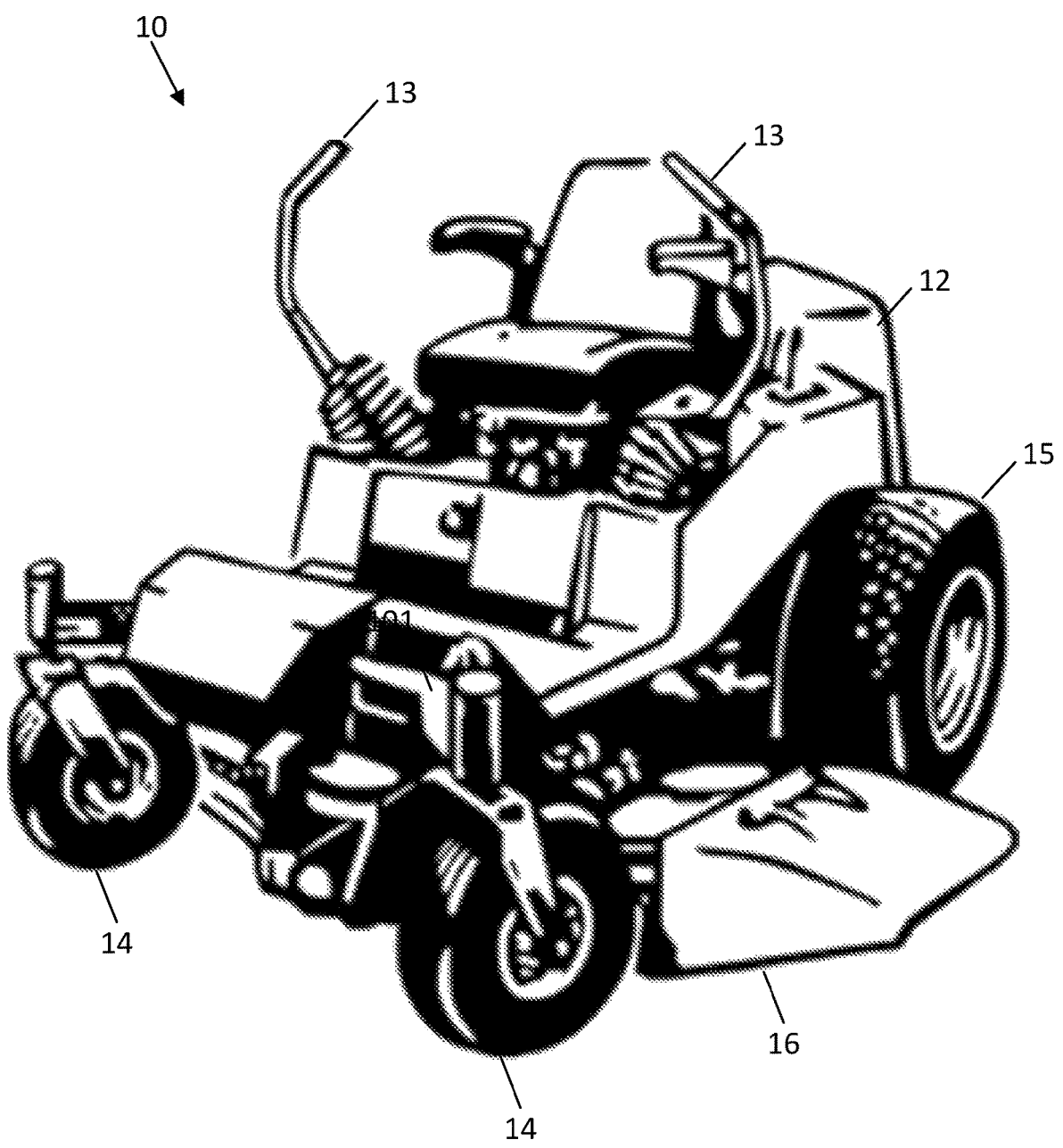
FIG. 1 illustrates an example electric vehicle.

The following embodiments include a set of electronically commutated motors in a single device or apparatus. An example apparatus may be the blades (e.g., blade deck) of a lawnmower such as a zero turn radius (ZTR) lawnmower. The lawnmower may be an electric vehicle, and other types of electric vehicles may be used with the following examples. One non-vehicle example for the apparatus may include an array of electric fans. An example electronically commutated motor is a three-phase, brushless motor. The motor may include a circuit board, an electronic control module, and a three-phase motor with a permanent magnet rotor.

An electric vehicle includes one or more motors that operate on battery power or other electric only sources. The term electric vehicle may be distinct from an electric car or electric automobile and encompass a wide variety of applications. Examples include lawnmowers, tillers, trimmers, tractors, utility vehicles, mobile aerial lifts, forklifts, and others. Any of these examples may include multiple motors controlled together according to the following examples. In some examples, rather than an electric vehicle, the following examples are implemented by an electric handheld device (e.g., trimmer, saw) having multiple motors controlled together.

In the battery or electric powered riding lawn care market, a cutting deck may contain multiple cutting blades. Previously, for example in the internal combustion engine (ICE) powered market, it was common to drive all blades from a belt that would be driven by the main ICE. In electric powered machines, that system has been replaced by individual electric AC motors driving each blade, eliminating the common maintenance items including the belt and motor brushes. Generally, it is required to have one electric power stage for each AC motor, whether these power stages are housed in one controller enclosure or in separate controllers. The costs associated with multiple power stages may be high.

Another drawback is that each motor controller may drive the blade motor at different speeds and torques. This may sometimes be seen as necessary as loading can be different at each blade (from grass thickness, height, etc.) and it is thought that a separate control and, thus, separate power section is required for each to allow independent control. Although some aspects are true in these assumptions, the control system does not need to be this precise. The only necessary requirements are that the blades all spin at substantially the same speed and that overload of any blade should shut down all blade to prevent a poor cut. It then follows that a single multi-phase power stage with unique control schemes can be applied and completely fulfil the needs of the lawn care cutting deck.

The following embodiments use a single power stage to drive the set of motors. The system may include an electrical power source (e.g., battery, AC, or other electric power source). The power source is connected to a single controller and provides power to a plurality of blade motors. There may be a speed feedback signal from each blade motor back to the controller.

To drive multiple brushless motors with a single controller/single power stage, there are several techniques that are employed:

(1) At the most simple/low cost implementation, the speed signal from each motor is a single channel pulse that detected blade motor rotation. Multi-channel signals can also be used.

(2) The system is started under a low torque need situation (not in high grass or in a block blade state). The controller will ramp up the motor speed request by sequencing the motor power signals through the single power sections while tracking (e.g., sensor feedback) whether each blade motor is following the trajectory.

(3) The controller provides commands to slow down each of the blade motors and match the trajectory of the slowest motor.

(4) The blade motors reach the commanded speed, full torque will be available to cut and an indication will be present (by communication bus or signal) to the machine vehicle manager.

(5) If any blade motor hits an object that exceeds its torque rating, the current measured at the power base will spike or increase above a set level. These events are detected and the system will shut down all motors to protect the system from damage at the point the system may be restarted under a low torque load.

(6) While in operation, one blade may encounter higher cutting load, increasing the load current, and slow down. The controller will sense this through the speed sense line(s) and power base current measurements and slow the power sequencing rate (rotation) to all motors to synchronize to the lowest speed motor. Speed will be restored when the toque is reduced (lower current) and the blades can be brought back up to nominal speed.

(7) This system can be designed to run at different cutting speed and cutting load set-points (as commanded by the vehicle manager or operator) while maintaining overall control.

FIG. 1 illustrates an example electric vehicle or lawnmower 10 including steering levers 13, blade deck 16, drive wheels 15, and castor wheels 14 connected to a frame or chassis 12. The blade deck 16 includes a set of electrically driven motors driven by a single controller. The drive wheels 15 may be electrically driven (e.g., by the same controller described herein for the blade motors). The castor wheel mat be follower wheels that freely turn in response to the direction of the drive wheels 15. The drive wheels 15 may alternatively be connected to hydraulic valves to control hydrostatic transmissions driven by belts from an internal combustion engine, which may be fueled by gasoline, diesel fuel, liquefied petroleum (LP), compressed natural gas (CNG), or another type of combustible fuel.

Figure 2:
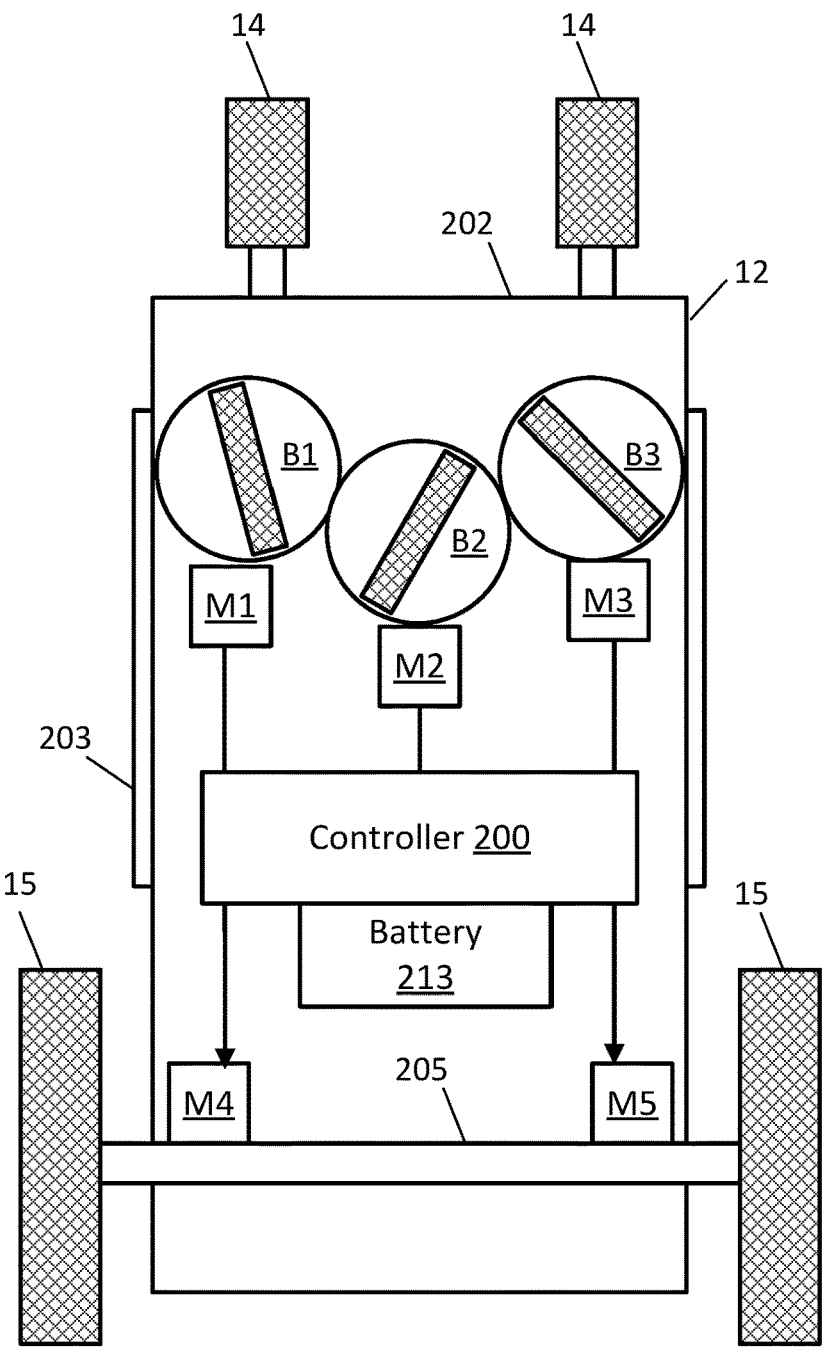
FIG. 2 illustrates an example lawnmower.

FIG. 2 illustrates an example lawnmower 10 including drive wheels 15, castor wheels 14, the chassis 12, and a seat 203 or other structure. A motor controller 200 is in communication with and controls blade motors M1, M2 and M3 and also one or more drive motor M4 and M5. The drive motors M4 and M5 may be connected to rear wheels 15 via shaft 205, and the front wheels 14 may be mounted on castors to freely move in any direction. The rear wheels 15 may be independently controlled by the controller 200 to steer the lawnmower 10. The controller 200 provides commands, or control signals, to the blade motors M1-M3, which turns the blade of the lawnmower. The controller 200 may also provide a machine vehicle manager to manage other systems, including the drive system. The machine vehicle manager may receive instructions from a user and provide messages, alerts, or indicators to the user. The vehicle manager may provide settings to the controller such as cutting load set-points. Additional, different, or fewer components may be included.

Figure 3:
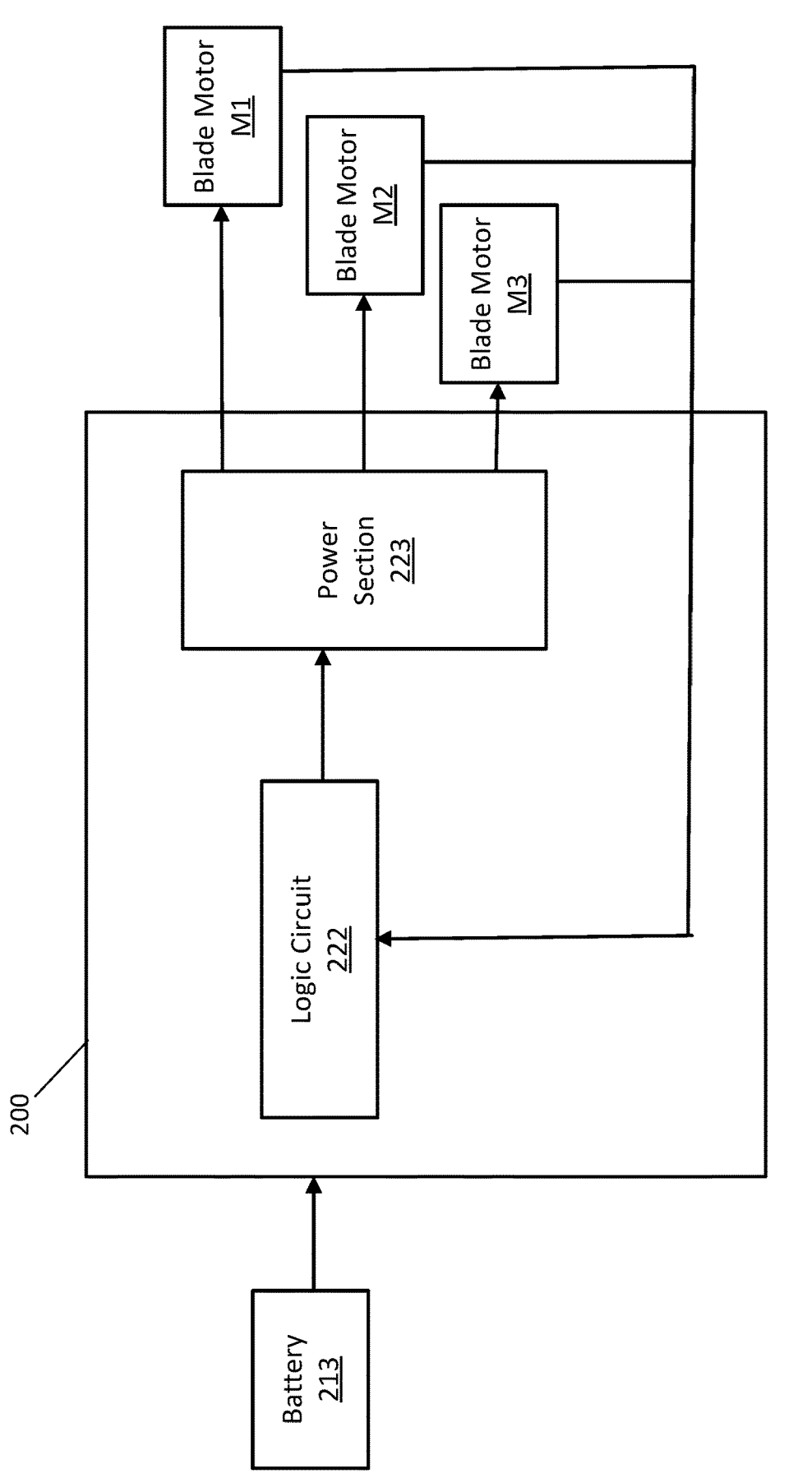
FIG. 3 illustrates an example motor controller.
Figure 4:
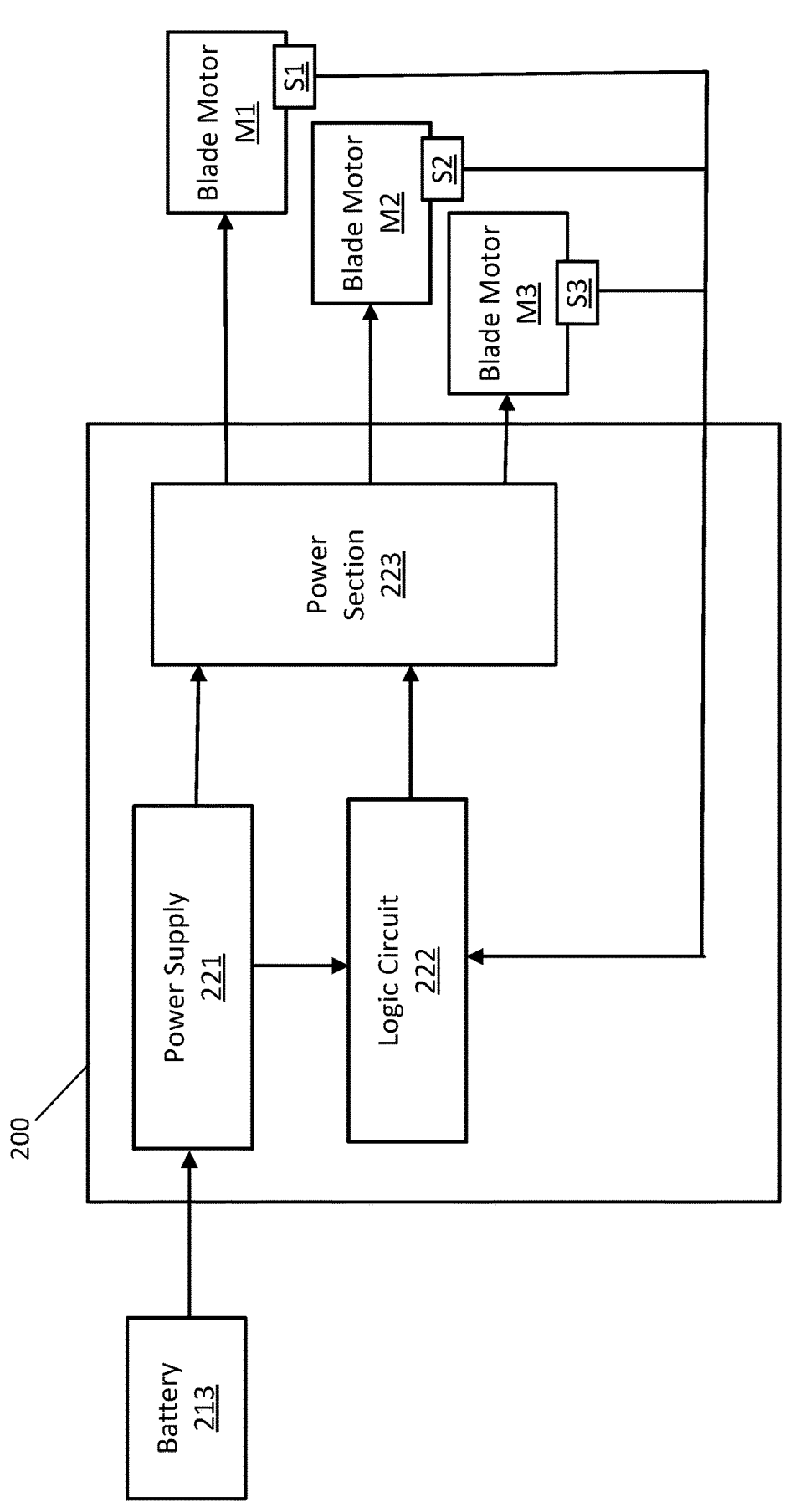
FIG. 4 illustrates another example motor controller.

FIG. 3 illustrates an example motor controller 200 including a logic circuit 222 and power section 223 (e.g., power stage). FIG. 4 illustrates a similar motor controller 200 also include a separate power supply 221. The controller 200 may be connected to the battery 213 and powered by the battery 213. The power supply 221 may be configured to convert the electrical signal received from the battery 213 to one or more converted signals as used by the logic circuit 222 and the power section 223. The electrical signal from the battery 213 as well as the converted signals may be DC and/or AC. Thus, the power supply 221 may include a DC to DC converter with one output for the logic circuit 222 and an inverter for the power section 223. Additional, different, or fewer components may be used.

The battery 213 may provide a voltage level to the power supply 221. The power supply 221 may convert the high voltage level to a first voltage level (low) for the logic circuit 222 and a second voltage level (high) for the power section 223. The power supply 221 regulates or minimizes these variations in the converted electrical signals. Examples for the high voltage level include 24, 48, or 96 volts (e.g., peak or RMS). Examples for the first low voltage level include 3.3 or 5 volts. Examples for the second low voltage level include 5, 8, or 10 volts.

The power section 223 is configured to provide a drive signal to the blade motors M1-M3. The blade motors M1-M3 may be electrically connected so that a single electrical power electrically connects the power section 223 to each of the blade motors M1-M3. In other words, the blade motors M1-M3 may be connected in parallel to the power section 223. More specifically, a first phase (phase A) for each of the blade motors M1-M3 may be connected together and to the first phase of the power section 223, a second phase (phase B) for each of the blade motors M1-M3 may be connected together and to the second phase of the power section 223, and a third phase (phase C) for each of the blade motors M1-M3 may be connected together and to the third phase of the power section 223.

The power section 223 may include a corresponding rectification circuit for each phase. The power section 223 drives high power elements or semiconductors including field effect transistors (FETs), metal-oxide semiconductor field effect transistors (MOSFETs), bipolar junction transistor (BJTs), insulated-gate bipolar transistors (IGBTs), silicon carbide, silicon controlled rectifier (SCR) or another semiconductor switch. Any of these example semiconductor switches may include a conditioning and control circuit that receives the second low voltage level converted signal from the power supply 221 and activates and deactivates the semiconductor switch in response to the second low voltage level converted signal.

The power section 223 may provide an electrical commutation signal in which a controller switches currents through the motor windings to produce rotating magnetic fields to lead the rotor to rotate. In some examples, an electronic sensor detects the angle of the rotor and controls the switches, which may include transistors (e.g., in the power section 223). The operation of the switches reverses the direction of the current (or possibly turns it off) at specific angles so the electromagnets create torque in one direction. The switches continually switches the phase to the windings to keep the motor turning. The switches in the power section 223 may be controlled using software, a microcontroller, a digital control circuit, or an analog control circuit.

In certain examples, such as in the case of blade motors M1-M3 no electronic feedback or sensor is needed to determine the angle of the rotor. That is, the power section 223 may provide an electrical commutation signal in which the controller 200 switches currents through in motor windings to produce rotating magnetic fields to lead the rotor to rotate according to a predetermined schedule or sequence. The schedule or sequence may depend on the types of blades (e.g., the moment of inertia for the blades). The schedule or sequence may be user configurable by a user input to the controller 200 or electric vehicle manager.

When the power section 223 begins to provide the commutation signal to the blade motors M1-M3, the power sections 223 starts at a first speed. That is the power section 223 may send a first command for the first phase of the blade motors M1-M3, wait a predetermined time period, send a second command for the first phase of the blade motors M1-M3, wait a predetermined time period, and send a third command for the third phase of the blade motors M1-M3. As the blade motors speed up, the power section 223 may reduce the predetermined time period between phases and repeat the process. Thus, the power section 223 may send a first command for the first phase of the blade motors M1-M3, wait a second predetermined time period, send a second command for the first phase of the blade motors M1-M3, wait the second predetermined time period, and send a third command for the third phase of the blade motors M1-M3. The power section 223 continues this repetitive sequence of commands according to the predetermined schedule or sequence. Eventually, the blade motors M1-M3 ramp up to the designated or target rotational speed.

In some examples, the sequence of commands is stored in a memory of the controller 200. In some example, the power section 223 includes circuitry or logic to realize the sequence of commands. The switches continually switches the phase to the windings to keep the motor turning. The switches in the power section 223 may be controlled using software, a microcontroller, a digital control circuit, or an analog control circuit. Alternatively, the logic for controlling the blade motors M1-M3 may be integrated with the motor. The bladed motors M1-M3 may be provided power from the power section 223 and automatically ramp up to the target speed based on the integrated logic. Rather than a target speed, the controller 200 may command to a target torque, which may be applied to each of the examples herein.

The power section 223 may also provide drive signals to the wheel motors M4 and M5. The power section 223 may include a bridge or other rectification circuit. The rectification circuit may be a DC to AC converter that converts the DC signal to a sinusoidal drive signal.

As the blade motors M1-M3 turn, under commands from the power section 223, feedback is provided from the motors M1-M3 to the logic circuit 222. The feedback may be electrical feedback such as a value for current traveling through the windings of the motors M1-M3. The electrical feedback may be detected by a current sensor on each of the motors M1-M3. In other examples, the logic circuit 222 is electrical connected to the circuit of the motors M1-M3 in order to detect the current. The controller 200 may calculate a change in current with respect to time (dI/dt or a derivative of electrical current) from the feedback signal.

In other examples, as shown in FIG. 4, sensors S1-S3 may detect a kinematic property of the motors M1-M3. The sensors S1-S3 may detect the speed of the motors. The sensors S1-S3 may include optical sensors that detect a pass point (e.g., dot or other indicia) on a blade, axle, or shaft of each of the motors M1-M3.

The logic circuit 222 is configured to receive a feedback signal from each of the blade motors M1-M3 and generate an output signal in response to the feedback signal. The logic circuit 22 may analyze the current, speed, or another measurement of the blade motors M1-M3 and adjust the target speed of the bladed motors M1-M3 in response to the analysis. The feedback signal may be indicative of tough grass, wet grass, or another type of clog that causes the blade motor to see a high load. The feedback signal may be indicative of an obstruction to a blade.

Figure 5:
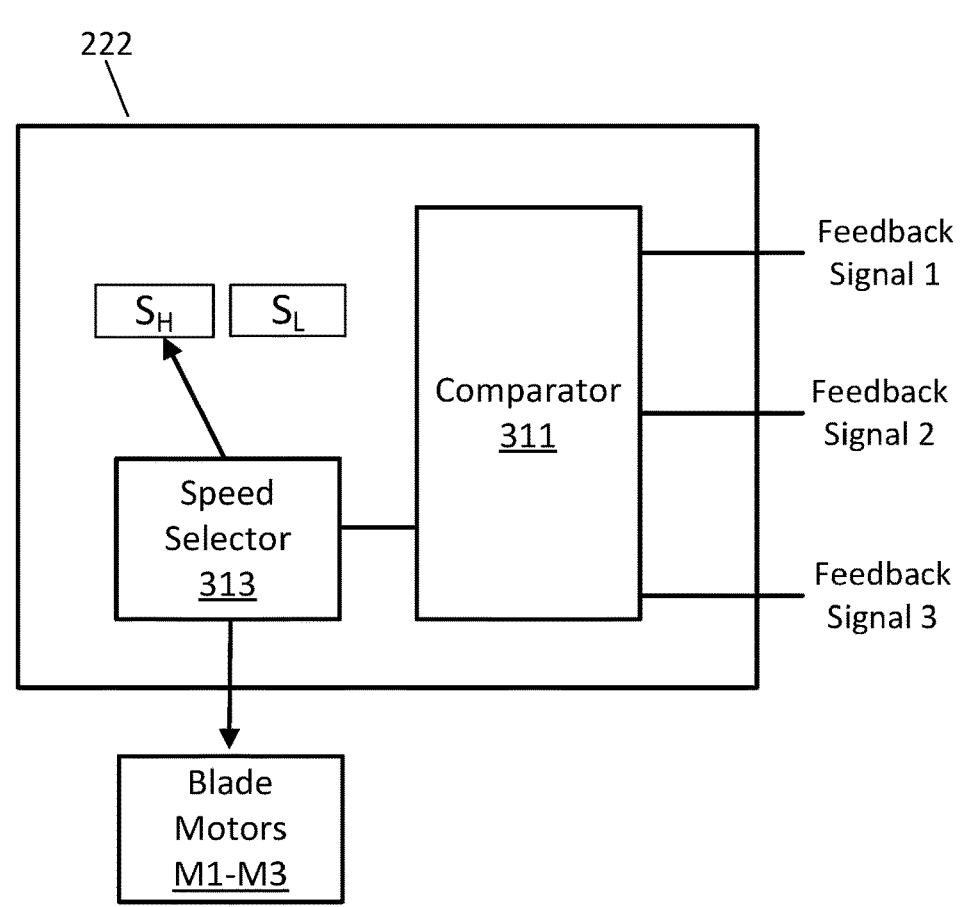
FIG. 5 illustrates an example logic circuit for the motor controller.
Figure 6:
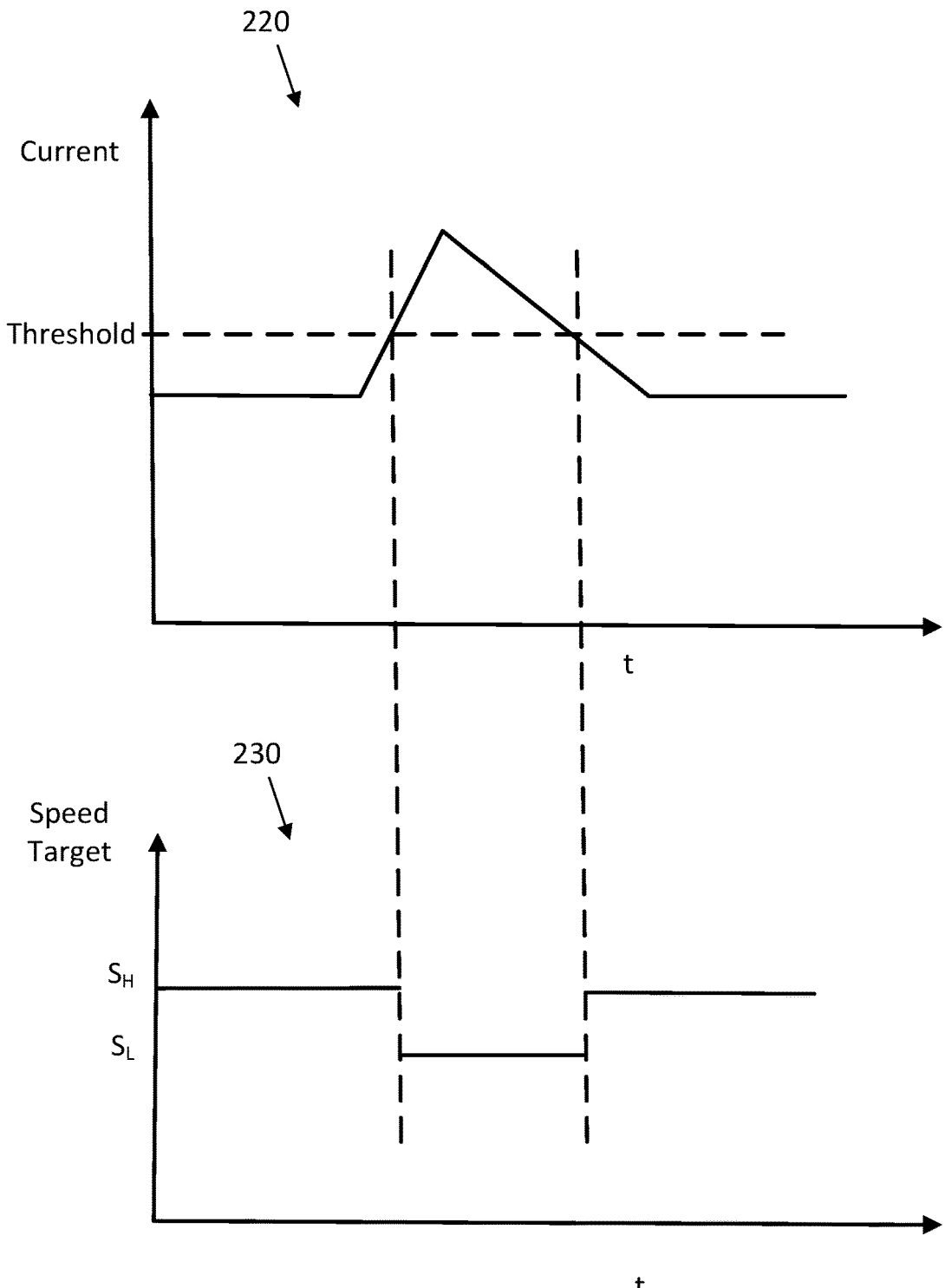
FIG. 6 illustrates an example feedback signal and output signal for the logic circuit of FIG. 4.

FIG. 5 illustrates an example logic circuit 222 for the motor controller 200. FIG. 6 illustrates charts for an example feedback signal 220 and output signal 230 for the logic circuit of FIG. 5.

The logic circuit 222 may include logic gates (e.g., AND gates, OR gates, etc.) to compare the feedback signals to one or more threshold and select a target speed for the blade motors M1-M3 in response to the comparison. The logic circuit 222 may include a comparator 311 and a speed selector 313. The threshold may be user configurable. In one example, an accelerometer or an inertial measurement unit detects the orientation or direction of the blade motors M1-M3 at sets the threshold based on the orientation.

The comparator 311 may determine if each, every, or some of the blade motors have surpassed the threshold. When the threshold is a threshold current, as shown in FIG. 6, the threshold is a current threshold. Examples for the current threshold may be 10 Amps (A), 30 A, or another value. In some examples, the comparator 311 analyzes each of the feedback signals individually and compares the current to a single motor threshold (e.g., 10 A). In some examples, the comparator 311 analyzes a sum of the feedback signals and compares the current sum to a motor array threshold (e.g., 30 A). The sum of the feedback signals may be a sum of the RMS value or peak value of the feedback signals so that one phase value for current is not cancelling out another phase value for current.

The comparator 311 sends an indication of whether each of the signals or the sum is below of above the threshold to the speed selector 313. Alternatively, the comparator 311 may send a binary signal to the speed selector 313. The binary signal may either be a first value (e.g., 1, high) that indicates that at least one of the blade motor feedback signals (or the sum) has surpassed the threshold or a second value (e.g., 0, low) that indicates that none of the blade motor feedback signals has surpassed the threshold. The logic circuit 222 identifies an obstruction or clog of one or more of the blade motors M1-M3 based on the feedback signals from each of the blade motors M1-M3.

In the example shown in FIG. 4, the speed selector 313 selects a high speed, when the binary signal is the low value. That is, when the motors are running under the threshold value, the speed selector 313 sends the high speed SH or target speed to the blade motors M1-M3 to continue running at normal cutting speed. The speed selector 313 selects a low speed SL when the binary signal is the high value. That is, when at least one of the motors are running above the threshold value, the speed selector 313 sends the low speed or caution speed to the blade motors M1-M3 to run at a low speed SL. The low speed SL is used when one of the blades may be clogged or another obstruction is met by one of the blades. Through this process, the logic circuit 222 causes the power section 223 to drive each of the blade motors M1-M3 simultaneously according to a slowest blade motor speed included in the feedback signals from each of the blade motors M1-M3.

Once the low speed or caution speed is selected, the speed selector 313 may immediately restart the speed sequence to slowly ramp of the speed of the blade motors M1-M3 according to the predetermined schedule. The speed selector 313 may also included a timer so that a time delay may be performed before returning to the predetermined schedule to increase the speed of the blade motors M1-M3. In another example, the speed selector 313 does not return to the startup schedule of speeds and instead waits a long time delay and commands the blade motors to the high speed SH at that time.

Figure 7:
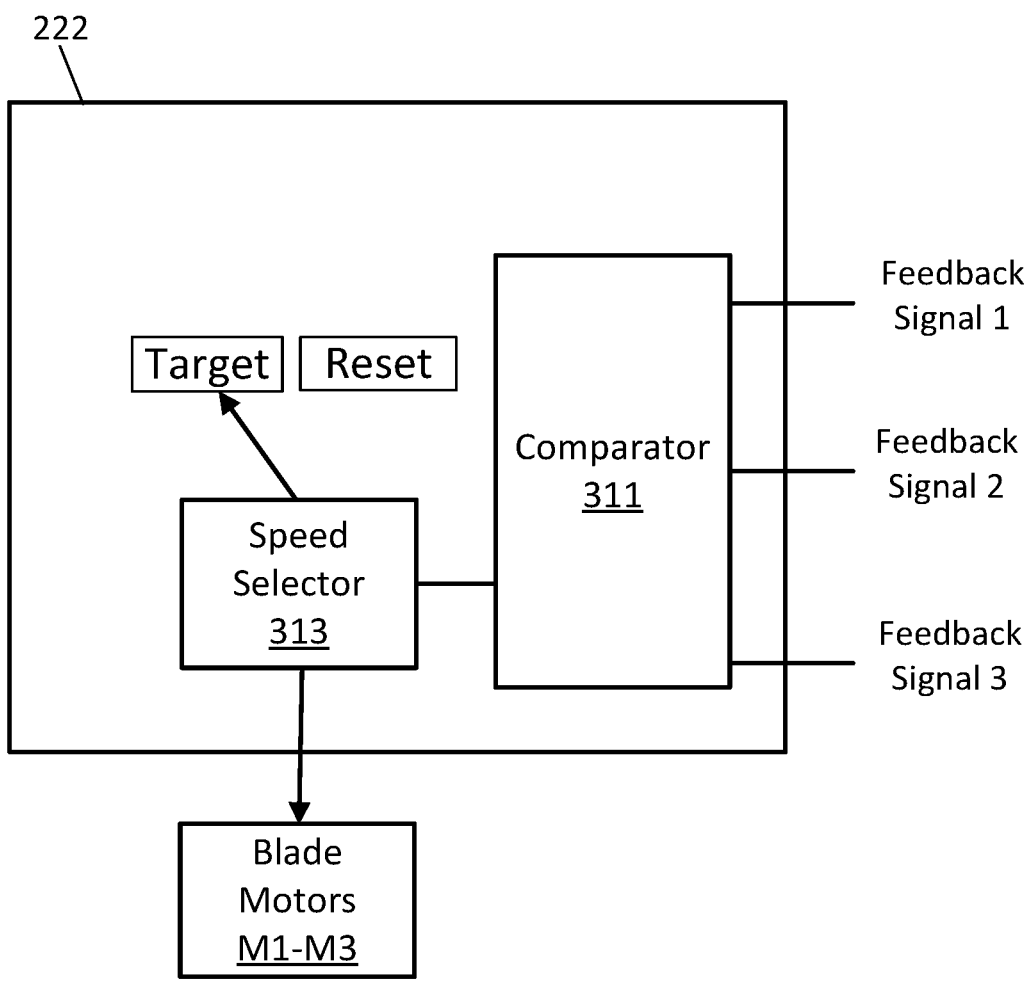
FIG. 7 illustrates another example logic circuit for the motor controller.

In the example shown in FIG. 7, the speed selector 313 selects either a target mode or a reset in response to the comparison of the comparator 311. In other words, the speed selector 313 follows the sequence to ramp up the speed of the motors M1-M3 to the target speed as long as the feedback signals do not indicate that an obstruction has occurred or the threshold current has been surpassed. That is, when the motors are running under the threshold value, the speed selector 313 sends the target to the blade motors M1-M3 to continue running at normal cutting speed or ramping up to normal cutting speed. The speed selector 313 resets this control when the binary signal is the high value or first value. That is, then at least one of the motors are running above the threshold value, the speed selector 313 switches to reset, which resets the sequence to ramp up the speed of the motors M1-M3 from the initial value to the target value. Through this process, the logic circuit 222 causes the power section 223 to drive each (all) of the blade motors M1-M3 simultaneously to reset to the initial speed and follow the predetermined sequence together when one or more of the motors faces an obstruction. The initial speed may be zero or another value. The speed selector 313 may also include a timer so that a time delay may be performed before returning to the predetermined schedule to increase the speed of the blade motors M1-M3. In another example, the reset reduces the speed to a proportion of the target speed. Example multipliers for the proportional reduction include 50%, 80% or another value.

The controller 200 includes may include a variety of other circuits or devices including an indicator such as a light, speaker, or display to provide information to the user. The indicator may indicate when the threshold has been exceeded to indicate an overcurrent or high speed. The indicator may indicate when an obstruction is detected based on the feedback signal from the blade motors M1-M3. The indicator may indicate a different light depending on which of the bladed motors M1-M3 is exceeding the threshold.

Figure 8:
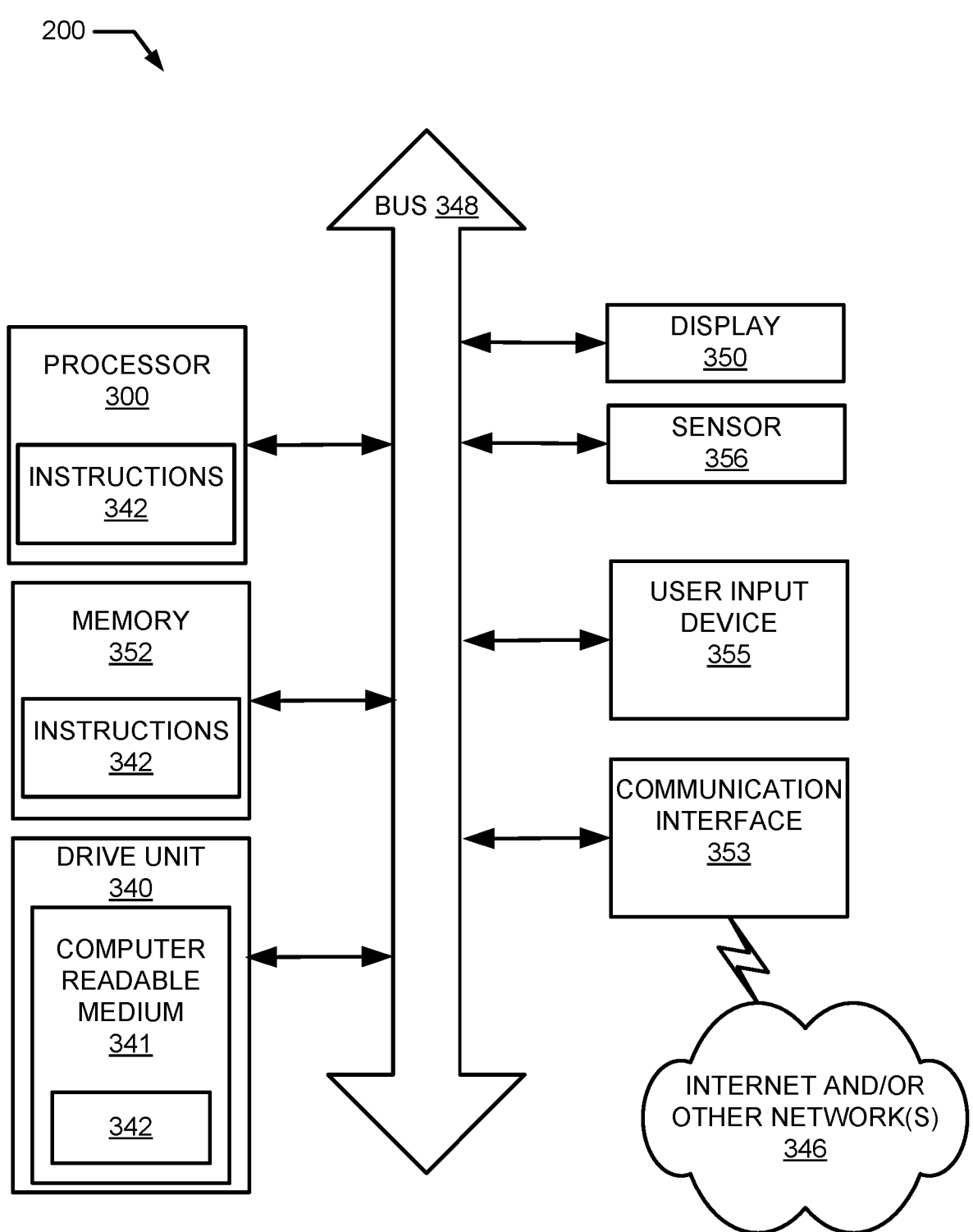
FIG. 8 illustrates an example microprocessor implementation of the example safety circuit.

FIG. 8 illustrates an example microprocessor implementation of the controller 200. The controller 200 may include a processor 300, a memory 352, and a communication interface 353 for interfacing with devices or to the internet and/or other networks 346. In addition to the communication interface 353, a sensor interface may be configured to receive data from the sensors described herein or data from any source. The components of the control system may communicate using bus 348. The control system may be connected to a workstation or another external device (e.g., control panel) and/or a database for receiving user inputs, system characteristics, and any of the values described herein.

Optionally, the control system may include an input device 355 and/or a sensing circuit 356 in communication with any of the sensors. The sensing circuit receives sensor measurements from sensors as described above. The input device may include any of the user inputs such as buttons, touchscreen, a keyboard, a microphone for voice inputs, a camera for gesture inputs, and/or another mechanism.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be an indicator or other screen output device. The display 350 may be combined with the user input device 355.

Figure 9:
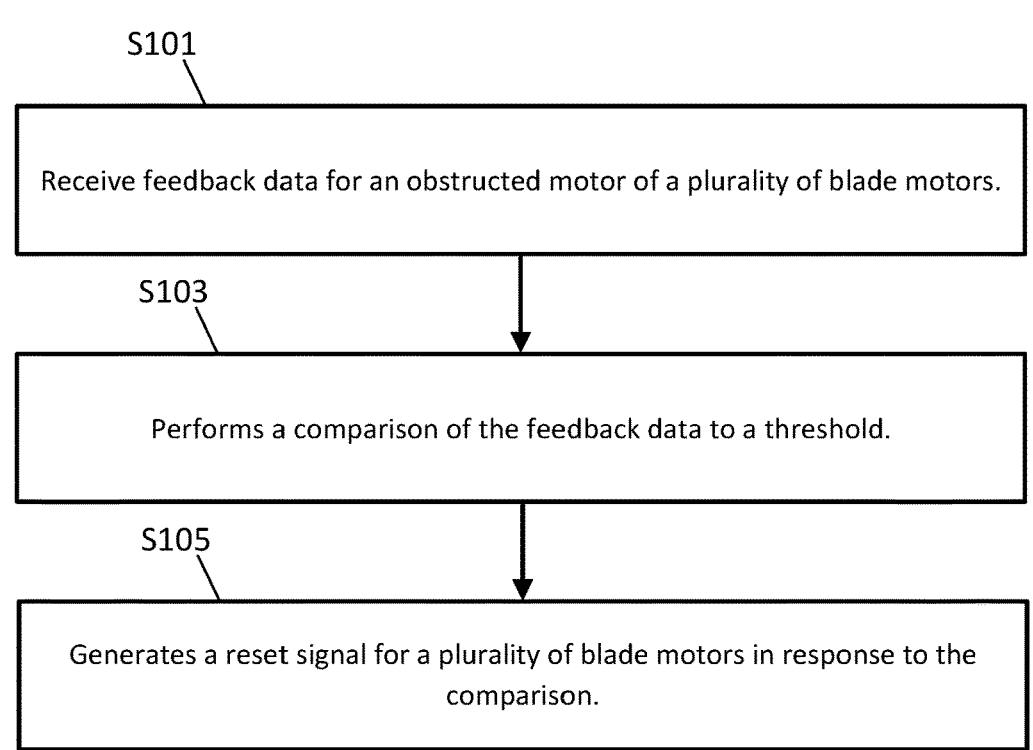
FIG. 9 illustrates a flow chart for the apparatus of FIG. 8.

FIG. 9 illustrates a flow chart for the apparatus of FIG. 8. The acts of the flow chart may be performed by the controller 200. Additional, different of fewer acts may be included.

At act S101, the controller 200 (e.g., processor 300) receives feedback data for an obstructed motor of a plurality of blade motors. The processor 300 may receive an analog signal for each of the blade motors. The analog signal may represent a quantity measured at the motor such as position, speed, current or voltage. The quantity may be load on the motor. The processor 300 may receive data that represents the quantity measured at each of the motors. The processor 300 may receive a single value (or series of value) that aggregates the quantity measured at each of the motors. That is, the feedback data may not indicate which of the motors has experienced an abnormality but only that at least one of the motors has experienced the abnormality.

At act S103, the controller 200 (e.g., processor 300) performs a comparison of the feedback data to a threshold. The threshold may be a load threshold. The load threshold is exceeded when the load on one of the motors is too high to perform sufficient cutting by the blade. The threshold may be applied to any of the quantities in S101. The processor 300 may analyze, condition, or filter the feedback data receive from the motors before performing the comparison. The comparison may be performed over time (e.g., multiple data samples) to prevent minor artifacts in the data from affecting the comparison.

At act S105, the controller 200 (e.g., processor 300) generates a reset signal for a plurality of blade motors in response to the comparison. When the comparison of the quantity from at least one blade motor exceeds the threshold, the reset signal is applied to the power circuit that supplies power to the blade motors. The reset signal may apply a multiplier to the commanded speed. For example, if the commanded speed is X, when the threshold is exceeded an obstruction has occurred, the power circuit commands new speed R*X, where R is a value between 0 and 1. In a numerical example, if the commanded speed is 2000 RPM, when the threshold is exceeded an obstruction has occurred, the power circuit commands new speed ½*2000 RPM or 1000 RPM, where R is ½. Any fractional or decimal value may be used for R. From there, the power circuit may proceed to ramp up the speed according to a time schedule or other technique. In another example, the reset signal causes the power signal to return to the initial speed value. From there, the power circuit may proceed to ramp up the speed according to a time schedule or other technique.

Processor 300 may be a general purpose or specific purpose processor, an application specific integrated circuit (ASIC), one or more programmable logic controllers (PLCs), one or more field programmable gate arrays (FP-GAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An apparatus for motor control of a lawnmower, the apparatus comprising:
    a plurality of blade motors coupled to the lawnmower;
    a logic circuit configured to receive a feedback signal from each of the plurality of blade motors and generate an output signal; and
    a power section configured to drive each of the plurality of blade motors simultaneously in response to the output signal, the logic circuit being further configured to compare the feedback signal to a threshold, and the power section is further configured to drive each of the plurality of blade motors to a slow speed or an initial speed when the feedback signal exceeds the threshold.

2. The apparatus of claim 1, wherein the power section ramps up a speed of the plurality of blade motors together according to a target speed or a target torque when the feedback signal does not exceed the threshold.

3. The apparatus of claim 1, wherein the logic circuit tracks a speed of the plurality of blade motors based on the feedback signals from each of the plurality of blade motors.

4. The apparatus of claim 1, wherein the logic circuit identifies an obstruction of one or more of the plurality of blade motors based on the feedback signals from each of the plurality of blade motors.

5. The apparatus of claim 1, wherein the power section drives each of the plurality of blade motors simultaneously according to a slowest blade motor speed included in the feedback signals from each of the plurality of blade motors when the feedback signal does not exceed the threshold.

6. The apparatus of claim 1, wherein the power section drives each of the plurality of blade motors simultaneously according to an increased load indicated by at least one of the feedback signals from each of the plurality of blade motors when the feedback signal does not exceed the threshold.

7. The apparatus of claim 1, wherein the controller calculates a change in current with respect to time from the feedback signal.

8. The apparatus of claim 1, wherein the power section drives each of the plurality of blade motors in a speed ramp from an intermediate speed to a target according in response to the output signal when the feedback signal does not exceed the threshold.

9. The apparatus of claim 1, wherein the power section drives each of the plurality of blade motors in a speed ramp from an initial speed to a target according in response to the output signal when the feedback signal does not exceed the threshold.

10. An apparatus for motor control of a lawnmower, the apparatus comprising:
    a plurality of blade motors coupled to the lawnmower; and
    a controller configured to:
        receive a feedback signal from each of the plurality of blade motors;
        compare the feedback signal to a threshold; and
        generate a drive signal to drive each of the plurality of blade motors simultaneously in response to the feedback signal, the drive signal instructing each of the plurality of blade motors to a slow speed or an initial speed when the feedback signal exceeds the threshold.

11. The apparatus of claim 10, wherein the feedback signal includes data for a current associated with each of the plurality of blade motors.

12. The apparatus of claim 10, wherein the feedback signal includes data for total current for the plurality of blade motors.

13. The apparatus of claim 10, wherein the controller is configured to return to a target speed after a predetermined time delay when the feedback signal does not exceed the threshold.

14. The apparatus of claim 10, wherein the feedback signal is indicative of a load on at least one of the plurality of blade motors.

15. A method for motor control of a lawnmower, the method comprising:
    receiving feedback data for an obstructed motor of a plurality of blade motors;
    performing a comparison of the feedback data to a threshold; and
    generating a reset signal for a plurality of blade motors in response to the comparison, the reset signal including a proportional multiplier of a target speed for the plurality of blade motors.

16. The method of claim 15, wherein the feedback data indicates a current through a winding of the obstructed motor.

17. The method of claim 15, wherein the reset signal further includes an initial speed for the plurality of blade motors.

* * * * *